Jan. 5, 1943.  E. I. POLLARD  2,307,604

INDUCTOR-TYPE ALTERNATING-CURRENT GENERATOR

Filed Jan. 15, 1941

DISTRIBUTION OF INDUCED CURRENT IN FRAME

WITNESSES:
Edward Michaels
F. P. Lyle

INVENTOR
Ernest I. Pollard.
BY
O.B. Buchanan
ATTORNEY

Patented Jan. 5, 1943

2,307,604

UNITED STATES PATENT OFFICE 2,307,604

INDUCTOR-TYPE ALTERNATING-CURRENT GENERATOR

Ernest I. Pollard, Irwin, Pa., assignor to Westinghouse Electric & Manufacturing Company, East Pittsburgh, Pa., a corporation of Pennsylvania Application January 15, 1941, Serial No. 374,499

3 Claims. (Cl. 171—212)

The present invention relates to alternating-current generators of the inductor type, and more particularly to the frame construction of such generators.

In the inductor type of alternating-current generator, a unidirectional magnetic field is provided which passes through conductors disposed on a stator core and through a toothed rotor member. When the rotor is rotated, the teeth cause variations in the reluctance of the magnetic path extending through any conductor on the stator, and thus cause corresponding variations in the flux which is linked by the conductor, so that an alternating voltage is induced in the stator conductors. In the usual construction of this type of machine, the stator conductors are placed in slots in an annular laminated core, which is supported in a cylindrical frame, and an exciting winding extends circumferentially around the frame to provide the unidirectional magnetic field.

Generators of this type are often used to supply high-frequency alternating current for induction heating equipment. In many applications of this type of equipment, such as surface hardening of small parts, the parts to be heat treated remain in the heating coil for only a very short time, and are removed and replaced by other parts at a rapid rate. This involves a frequent and rapid change in the load on the generator, which requires a correspondingly frequent and rapid change of the exciting current. Since, in the usual construction, the field winding of the machine extends circumferentially around the frame, this rapid change in exciting current causes induced currents to circulate in the frame. These currents flow circumferentially around the frame and produce a rather strong damping effect in the field winding, thus retarding the change of current in it, and making it difficult to change the exciting current as rapidly as is necessary for many applications. This is a decided disadvantage when the generator is to be used for supplying induction heating equipment for heat treating small parts at a high rate. This damping effect could, of course, be eliminated by using a completely laminated frame to prevent the circulation of induced currents, but such a construction would be extremely expensive, and is not economically practical for that reason.

The principal object of the present invention is to provide a construction for inductor type alternating current generators in which the damping effect of induced currents in the frame is greatly reduced, thus permitting a more rapid change in the exciting current.

More specifically, the object of the invention is to provide a generator of the inductor type in which the frame is divided into two or more sections which are insulated from each other, so that the magnitude of the induced currents circulating in the frame is greatly reduced, and their damping effect on the field winding is correspondingly reduced.

Other objects and advantages of the invention will be apparent from the following detailed description, taken in connection with the accompanying drawing, in which.

Figure 1:
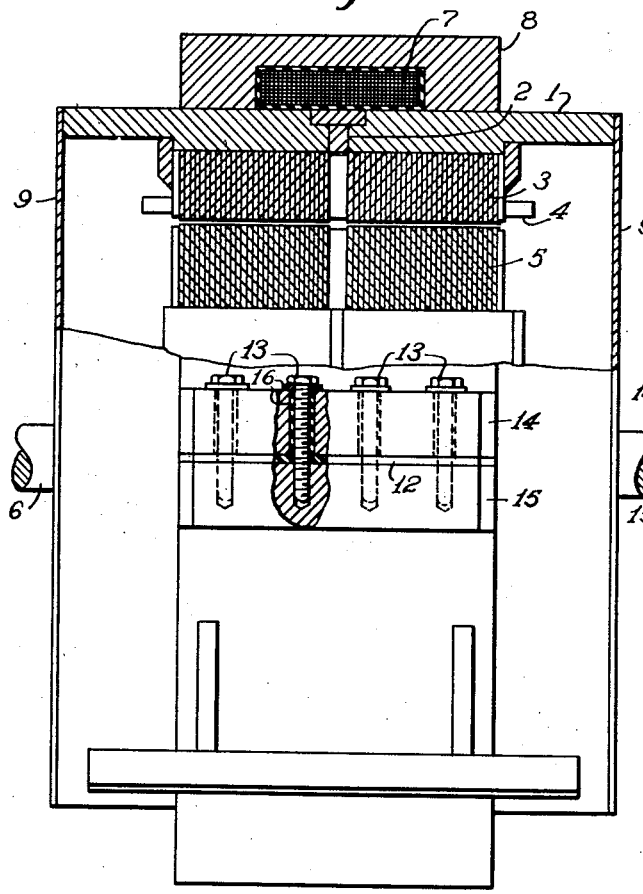
Figure 1 is a side elevation, partly in section, of an inductor-type generator.
Figure 2:
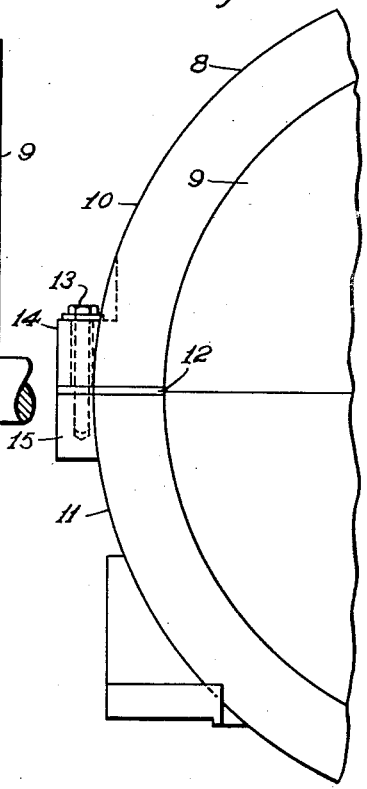
Fig. 2 is a partial end view of the generator.

The machine shown in Fig. 1 has a generally cylindrical frame member 1 of steel, or other magnetic material, which is preferably divided into two axially spaced parts separated by a spacer 2 of non-magnetic material, such as brass or aluminum. A laminated stator core 3 is supported in the housing 1, and suitable armature conductors 4 are placed in slots in the core 3 and connected together to form a suitable winding for the machine. A laminated toothed rotor member 5 is secured on the shaft 6, and may be of any suitable or usual construction. The stator core 3 and rotor 5 are preferably separated into two axially spaced portions, as shown in the drawing. The unidirectional magnetic field is supplied by an exciting winding 7 which extends circumferentially around the outside of the frame member 1, and the magnetic circuit for the field is completed by a generally cylindrical frame member 8 of steel, or other suitable magnetic material, which encloses the winding 7. Since the two halves of the frame member 1 are separated by non-magnetic material, it will be apparent that the magnetic field of the coil 7 will extend radially through each half of the rotor and stator and will be in opposite directions in the two halves. For this reason it is necessary to angularly displace one half of the rotor with respect to the other a distance equal to the width of a stator tooth-pitch, in order that the induced voltages in the armature conductors 4 will be in phase and will add directly in the two halves of the stator. The ends of the frame member may be closed by suitable end bells 9 in the usual manner.

In accordance with the present invention, the frame member 8, which is generally cylindrical, is divided into at least two sections which are insulated from each other. Thus, as shown in the drawing, the frame 8 is divided along a horizontal plane into two semi-cylindrical sections 10 and 11, which are insulated from each other by a layer of suitable insulating material 12. The two halves are secured together by bolts 13 which pass through a boss 14 on the upper section 10, and are threaded into a corresponding boss 15 on the lower section 11. The bolts 13 are insulated from the boss 14 by insulating bushings 16, so that the two sections of the frame are completely isolated from each other electrically.

Figure 3:
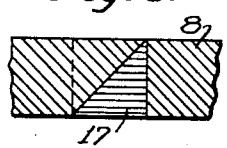
Figs. 3 and 4 are diagrams illustrating the effect of the present invention.
Figure 4:
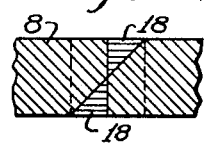

The effect of this construction is illustrated in the diagrams of Figs. 3 and 4, which show enlarged fragmentary portions of the frame member 8 in cross-section. In the usual construction of inductor generators, in which a solid or at least an electrically continuous frame is used, any change in the current in the exciting winding 7 causes induced currents to flow circumferentially in the frame because of the change in the flux linking the frame 1. The distribution of these currents is approximately as shown by the shaded area 17 in Fig. 3, the maximum current density being at the inner surface of the frame, and the current density decreasing to zero at the outer surface, so that a triangular distribution of current is obtained.

When the frame is divided into two sections which are insulated from each other, in accordance with the present invention, the induced current cannot flow continuously around the frame, but can only flow as far as the insulated joint between the two sections. A return path for this current, which flows chiefly at the inner surface of the frame, must be present, however, and this return path can only be at the outside surface of the frame, so that a current distribution is obtained which is shown by the shaded areas 18 in Fig. 4. As shown in this figure, the maximum current densities are at the inner and outer surfaces of the frame, and the current density decreases to zero at approximately the center of the frame. It will be seen from this figure that while the induced voltage causing the current to flow remains the same, the current distribution is such that the maximum magnitude of the current is only approximately half of the maximum magnitude of the current flowing in an uninsulated frame, as shown in Fig. 3. Thus, the effect of dividing the frame into two insulated sections is equivalent to doubling the resistance of the path of the induced current in the frame, so that its magnitude is only about half as great as it would be in the conventional, electrically continuous frame. For this reason, the flux interlinkages with the exciting winding caused by the currents circulating in the frame are reduced to approximately one-half of what they would be with the conventional construction, and the damping effect caused by these currents is, therefore, also reduced to approximately one-half. Thus, more rapid changes in the current are possible with a machine constructed in accordance with the present invention than would be possible with machines of the conventional construction, and much more effective operation is obtained in applications where rapid changes of load are required.

It should now be apparent, therefore, that a frame construction has been provided for alternating-current generators of the inductor type in which the damping effect on the exciting winding of currents induced in the frame is greatly reduced, thus permitting more rapid change in the exciting current of the machine when required by rapid and frequent changes of load. This construction is about half as effective in reducing the damping effect in the exciting winding as a completely laminated frame would be, but it has the advantage of being an economically practical construction, whereas the cost of a completely laminated frame would be prohibitive.

It will be understood, of course, that the invention is capable of various modifications and embodiments, although a preferred embodiment has been shown and described for the purpose of illustration. The frame may be divided into any desired number of sections on planes which are parallel to the axis of the machine, so that the plane of separation between adjacent sections is generally normal to the direction of flow of the induced currents in the frame, and the sections may be secured together and insulated from each other in any desired manner. Thus, although a specific embodiment of the invention has been disclosed, it is to be understood that various changes and modifications may be made, without departing from the spirit of the invention, and that the invention is not limited to the particular details of construction shown and described, but in its broadest aspects it includes all modifications and embodiments which come within the scope of the appended claims.

I claim as my invention:

1. An alternating-current generator of the inductor type having a stator member and a rotor member, the stator member including a generally cylindrical metal frame structure, a laminated core supported in the frame structure and having windings thereon, and an exciting winding carried by the frame structure, said frame structure being divided on planes parallel to the axis of the generator into at least two sections, said sections being insulated from each other.

2. An alternating-current generator of the inductor type having a stator member and a rotor member, the stator member including a generally cylindrical metal frame structure, a laminated core supported in the frame structure and having windings thereon, and an exciting winding carried by the frame structure, said frame structure being divided into two semi-cylindrical sections on a plane parallel to the axis of the rotor member, said sections being insulated from each other.

3. An alternating-current generator of the inductor type having a generally cylindrical metal frame structure and an exciting winding supported on the frame structure and extending circumferentially around the frame, said frame structure being divided into at least two sections on planes substantially parallel to the longitudinal axis of the exciting winding, said sections being insulated from each other.

ERNEST I. POLLARD.